United States Patent [19]

Kabel

[11] 4,185,800
[45] Jan. 29, 1980

[54] TWO-PART HOLE FASTENER

[75] Inventor: Heinrich Kabel, Quickborn, Fed. Rep. of Germany

[73] Assignee: Paul Hellermann GmbH, Fed. Rep. of Germany

[21] Appl. No.: 799,202

[22] Filed: May 23, 1977

[30] Foreign Application Priority Data

Jun. 3, 1976 [DE] Fed. Rep. of Germany ....... 2624968

[51] Int. Cl.² .............................................. F16L 3/08
[52] U.S. Cl. .................................. 248/73; 24/211 R; 85/5 R; 85/79; 248/74 A; 248/74 PB
[58] Field of Search ............ 248/73, 71, 74 PB, 74 A; 85/79, 72, 23, 5 R, 8.3, 1 S, DIG. 2; 24/73 AP, 73 PB, 213 CS, 211 R

[56] References Cited

U.S. PATENT DOCUMENTS

| | | | |
|---|---|---|---|
| 780,960 | 1/1905 | Palmer | 248/71 X |
| 1,095,432 | 5/1914 | Stark | 85/23 |
| 2,238,463 | 4/1941 | Dubilier | 85/8.1 X |
| 2,409,180 | 10/1946 | Annett et al. | 85/79 X |
| 2,748,594 | 6/1956 | Edwards | 85/79 |
| 3,126,184 | 3/1964 | Kropp | 248/73 |
| 3,157,377 | 11/1964 | Orenick | 248/71 |
| 3,302,913 | 2/1967 | Collyer et al. | 248/73 |
| 4,034,944 | 7/1977 | Moran | 248/56 |

FOREIGN PATENT DOCUMENTS

| | | | |
|---|---|---|---|
| 233324 | 11/1959 | Australia | 248/74 PB |
| 2541105 | 3/1977 | Fed. Rep. of Germany | 85/1 S |
| 1545835 | 10/1967 | France | 248/74 PB |

*Primary Examiner*—Rodney H. Bonck
*Attorney, Agent, or Firm*—Prutzman, Kalb, Chilton & Alix

[57] ABSTRACT

A fastener for anchoring in a hole, formed through a panel structure, by applying the fastener to the hole from one side only, comprises an elongate shank divided longitudinally thereof into two parts, one of which has a portion of uniform, prismatic cross-section along its length and the other of which widens in cross-section towards its free end, said other part has a cross-section so that it is freely insertable into the hole, then the prismatic part is inserted causing the shank to widen on the other side of the panel. The two shank parts may be provided with respective head portions which may be provided at the opposite ends of a clamping strap.

9 Claims, 14 Drawing Figures

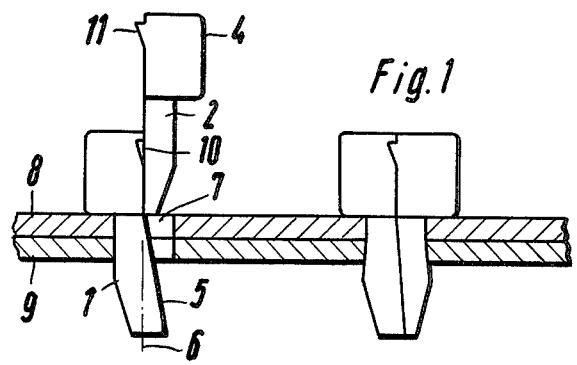
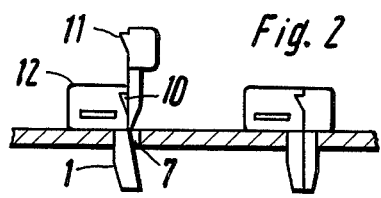
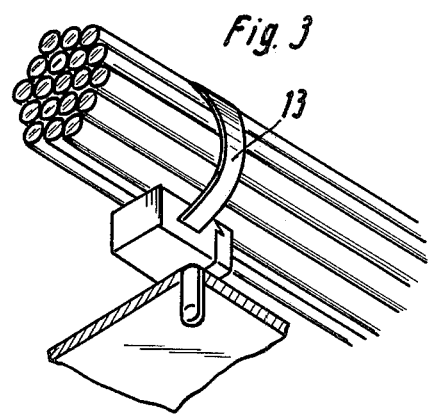
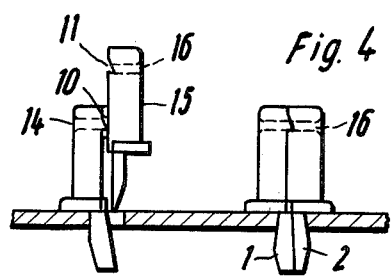
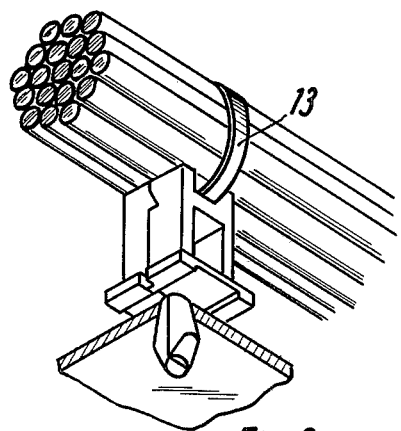
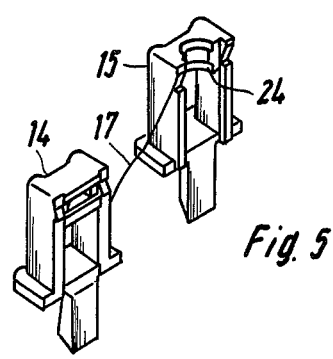

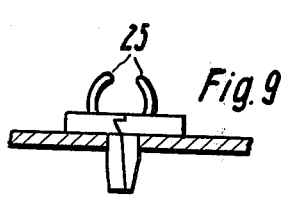
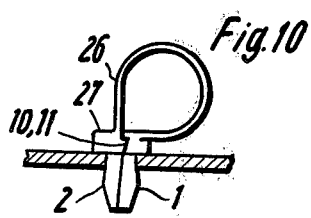
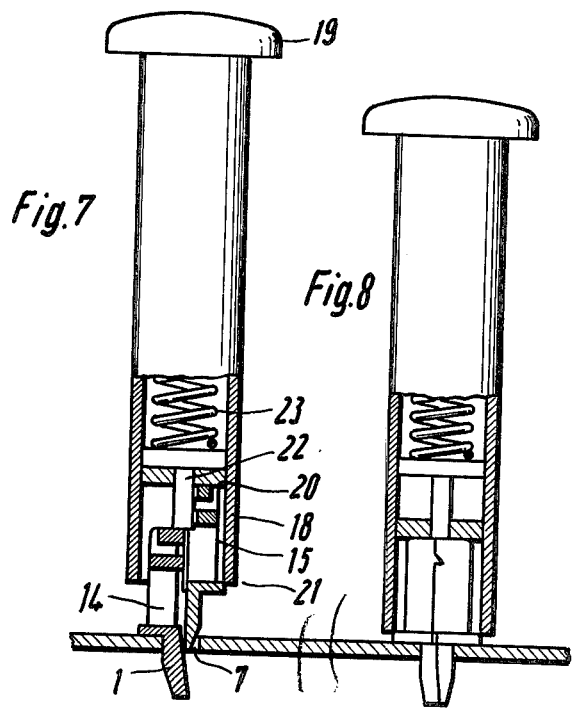
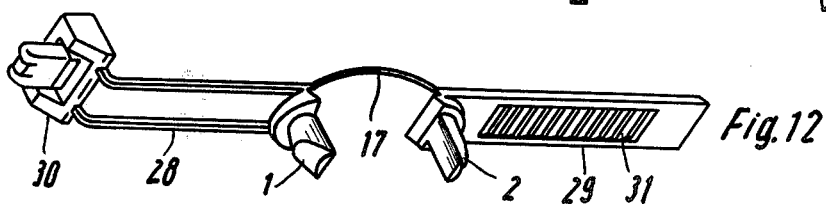
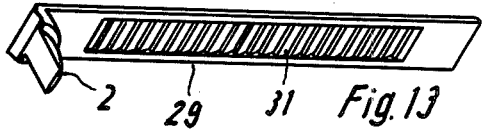
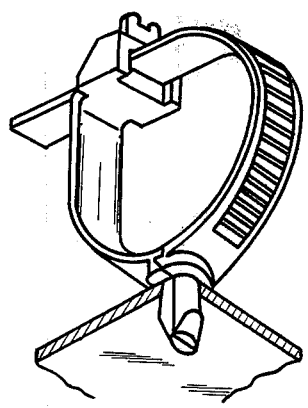
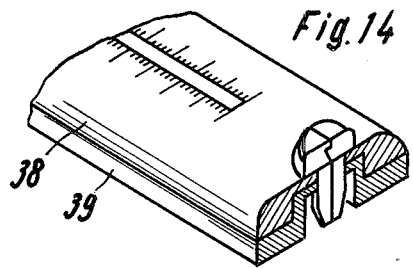

TWO-PART HOLE FASTENER

This invention relates to a fastener which can be anchored in a hole formed through a panel-like structure by applying the fastener to the hole exclusively from one side of the panel-like structure.

Fasteners of the above type are known in the form of expanding studs which consists of a ring of expanding portions parallel with the axis and seated round a hole in a head, and a prismatic pin which can be driven into that hole. The hole enclosed by the expanding portions tapers inwards in the driving direction. If after insertion of the stud in the hole in the panel-like structure, the pin is driven between the expanding portions, these are forced radially apart, whereby the overall diameter of the expanding portions and the pin beyond are enlarged above the size of the panel-hole and hence the fastener is secured in that hole. These fasteners have the disadvantage that the force-transmitting cross-section is confined to a relatively small part of the stud, namely to the ring of expanding portions. Also, in the radial direction these portions, are made fairly thin so that they can bend radially outwards under the action of the pin. These thin cross-sections can easily be damaged by unfavourable causes (for example, burrs or sharp edges in the panel-hole). In spite of relatively large diameters of the studs of these fasteners, their loading capacity is limited. A further disadvantage of the known fasteners consists in the fact that for a certain diameter of panel-hole only small tolerances can be allowed in the thickness of the panel-like structure, because the taper of the portions of the stud bulging out beyond the hole is fairly large.

The object of this invention is to create a fastener of the kind described above, which based on the diameter of the hole in the panel-like structure has a high loading capacity and is less sensitive with respect to causes of damage.

This invention provides a fastener which can be anchored in a hole formed through a panel-like structure by applying the fastener to the hole exclusively from one side of said structure, said fastener comprising a shank divided longitudinally thereof into two parts, one of which is prismatic, the arrangement being such that insertion of the prismatic part into the hole, after the other part is already inserted into the hole, causes the shank to widen beyond the hole to anchor the shank against subsequent withdrawal.

In constrast with the expander-pin of the known expanding stud described above, the prismatic shank part of the fastener in accordance with the invention participates in the transmission of the forces. The whole of the cross-section of the shank therefore is available for transmission of force. A considerable advantage of the invention also consists in the fact that the portions of the shank bulging out beyond the panel-hole do not have to be distributed around the prismatic part in the form of a ring with, in each case, relatively small radial thickness; on the contrary it is possible for the shank to comprise several parts compact in cross-section, but preferably with only the one prismatic part and one other part both of an approximately semicircular cross-section.

In order that the prismatic part of the shank can participate in both directions in the transmission of force it advantageously snaps positively together with the other part of the shank. Formations providing the snap engagement do not have to be arranged on the parts of the shank themselves but may, for example, be provided on head portions with which the shank parts may be provided.

In many cases it is enough to provide only said other shank part, which preferably is tapered so as to widen beyond the panel-hole, with a head portion. However, it is preferable to equip both parts of the shank with a head portion, which head portions abut the one side of the panel structure around the hole therein. These head portions may be made for different holding functions. For example, they may be provided at opposite ends of a clamp strap. But the invention is applicable particularly in the case of two-part clamps which have respective free ends which interlock, the shank parts being provided at the other ends of the two clamps, because it is then possible to provide different lengths of clamp merely by different dimensioning of the length of one of the two parts of the clamp.

In the case of yet another embodiment of the invention the prismatic part of the shank is formed by the clamp strap itself. Cable clamps are known, the clamp strap of which is toothed in order to cooperate with a pawl or snap device which is arranged in a lock lying at the end of the clamp strap. This lock may in connection with the invention comprise said other shank part or the head portion provided thereon, the latter being provided with a snap formation which cooperates with the toothed clamp strap and thereby both ensures the tension of the strap and also secures the clamp strap as the prismatic part of the shank in the hole in the panel-like structure.

In embodiments to be described herein, the locking of the fastener in the hole in the panel-like structure occurs solely by the overall thickness of the two parts of the shank beyond the hole being larger than the width of the hole, without it mattering about the direction in which the thickening of said other part of the shank is put. But in accordance with the invention it may be particularly advantageous if this thickening (based on the axial direction of the part widening beyond the hole) is directed towards the side at which the prismatic part of the shank is lying. That is, the end regions of the two parts of the shank and the head parts associated with them are urged resiliently together, whereby the tension necessary for the snap formation can easily be generated. Equivalently, the prismatic part of the shank may be made sloping or inclined towards the other. A corresponding slope may also be provided on the interfacing boundary surfaces of the head portions. In the case of such an arrangement the snap formations are advantageously arranged at a certain distance from the region of the shank which lies in the hole, so that the above-mentioned resilient forces can take effect upon the snap formations. In this connection it does not matter whether the snap formations are provided on the shank or on the head.

In order to ensure an orderly mutual position of the parts of the shank they may be provided with cooperating longitudinal guides. These may be arranged on the parts of the shank themselves or on the head portions provided thereon.

The two parts of the shank are advantageously connected together by a thin flexible bridge of material, so that in use one does not have to search and pick out two parts which are complementary. Such a bridge of material does not have to be provided directly on the shank parts but may, for example, be arranged on the head portions provided thereon.

One result of the compactness of the shank in accordance with the invention, and the small diameter necessary for it, is that the tolerances on diameter may be small. The angle of widening of the shank beyond the hole may therefore also be correspondingly small. This has the advantage that on the one hand large tolerances on thickness may be taken up and panel-like structures of quite different thicknesses may be satisfied by the same size of fastener and on the other hand only relatively small bending of the shank with correspondingly low stressing of the bent cross-section takes place. If the fastener in accordance with the invention is being mounted in thin sheet metal one may reckon that also only small forces need to be taken up, so that a seat of the shank in the hole which is indeed free of play but not much too tight is enough. If on the contrary the fastener is to be mounted in a thick sheet a quite tight seat is desirable. These requirement may be met if the widening is allowed to start already within that region of the shank which (at least in the case of the employment of relatively thick panel-like structural parts) lies in the region of the hole.

The angle of widening, at least in the region of the hole, is advantageously not greater than 15°, in particular not greater than 12°. Angles of widening in the region of 10° have stood the test. In this connection by angle of widening is to be understood the angle between the boundary surface between the two parts of the shank and the opposite outer surface of said other part of the shank. This angle is identical with the angle between the diametrically opposed most widely spread surface lines of the assembled shank.

Mounting of the fastener in accordance with the invention is simple. First of all said other part of the shank is pushed into the panel-hole. Then the prismatic part of the shank is inserted. The head portions provided on these parts are advantageously so formed that the forces of insertion may easily be exerted.

Mounting is particularly easily achieved with a tool comprising a holder into which the two parts of the fastener can be inserted, offset in the longitudinal direction, said holder being provided with a stop for each part, the two stops being arranged to transmit forces to the respective parts for inserting those parts in the hole, the stop for said other part being resiliently depressible into the holder. If the holder, with the fastener parts received therein, is moved in the direction of mounting first of all the one part of the shank, supported by the depressible stop, is slid into the hole until its head portion rests against the surface of the panel-like structure: upon further movement of the holder, the other part of the shank follows, pushed by its stop, whilst the depressible stop is depressed against its resilience.

Embodiments of the invention will now be described, by way of examples only, with reference to the accompanying drawings, in which:

FIG. 1 shows in section a first embodiment of fastener which connects together, like a bolt, two metal sheets;

FIG. 2 shows in section a second embodiment of fastener, of which one of the two parts of the shank carries a head portion formed with an eye;

FIG. 3 shows in a perspective view, the second embodiment of fastener in the mounted state with a cable harness;

FIG. 4 shows in section a third embodiment of fastener, in which the two shank parts have respective head portions, which together form a single head having an eye;

FIG. 5 is a perspective view of the fastener of FIG. 4;

FIG. 6 is a perspective view of the third embodiment in the mounted state with a cable harness;

FIGS. 7 and 8 show in section, and in different states of operation, a tool for mounting the third embodiment in its panel-hole;

FIG. 9 shows in section a fourth embodiment of fastener in which the two shank parts together form a clamp;

FIG. 10 shows in section a fifth embodiment of fastener in which the two shank parts are provided at the opposite ends of a clamp strap;

FIG. 11 shows a sixth embodiment in a perspective view, forming a tightenable clamp strap;

FIGS. 12 and 13 show, in perspective views, the sixth embodiment with different lengths of strap; and FIG. 14 shows in perspective an example of use of the fastener as a security fastening.

In accordance with FIG. 1, a fastener comprises a shank composed of two parts 1 and 2 which, together with respective head portions 3 and 4 provided thereon, complete a circular cross-section and are divided along a diameter. In the case of part 1 of the shank, however, the plane of division 5 deviates, with increasing distance from the head part 3, from the centre line 6 by an angle of about 10°, whereby the part 1 of the shank with increasing distance from the associated head part 3 bulges out. This bulging out occurs exclusively transversely to the plane of division 5. It therefore in no way impedes pushing of the part 1 of the shank through the common hole 7 in the metal sheets 8 and 9 to be connected, the diameter of which is about equal to that of the shank next to the head 3,4.

The part 2 of the shank is made prismatic, that is, as a rule bounded in cross-section by a semicircle. After insertion of the part 1 of the shank in the hole 7 the part 2 is driven through the cross-section of the hole which remains free and thereby partially displaces the part 1 of the shank beyond the hole. In the final state which is shown on the right in FIG. 1 both parts of the shank are bent outwards in opposite directions and-transversely to the plane of division 5-have a width which is greater than the diameter of the hole 7. If the metal sheets 8 and 9 to be connected strain apart, the position of the sheet 8 is secured by the head 3,4 whilst the sheet 9 is held firm by the bulging of the shank, which acts approximately uniformly at both sides of the shank. Both parts of the shank participate about equally in the transmission of force.

An important feature in this connection is the relatively small taper of the shank, which starts already in the region of the hole 7 and which allows the application of the connector to panel-like structures of different thickness with the same diameter of hole. Certainly it is quite clear that the prismatic part 2 of the shank is harder to drive into the longer hole in a thicker structural part than into the short hole in a thin structural part because in the former the bulging of the part 1 of the shank makes itself more strongly noticeable, but this is an altogether welcome phenomenon because it may be admitted that with thicker structural parts higher forces too have to be accepted, with which a tighter seat of the connector is advantageous.

In order that the prismatic part 2 of the shank may not come out of the hole because of the action of random force a snap connection is provided in the region of the head parts 3,4, which consists of a snap tooth 10 and a snap recess 11. These snap formations are so made as to be effective like a barb against the direction of release of the prismatic part 2 of the shank. But this barb action matters little if care is taken in other ways that the prismatic part of the shank in its direction of release meets with a threshold of force which is not as a rule exceeded by random forces of release. But such a threshold of force too may in many cases be waived if the forces of friction are adequate to keep the prismatic part of the shank in the required position. The shape of the cross-section of the shank will in most cases be round. As may readily be realized, however, this is not absolutely necessary in connection with the invention, because the action in accordance with the invention may occur in the case of shanks shaped otherwise in cross-section. For example, the shank may be square or rectangular in cross-section. For example, one can conceive of the shank being elongated in the direction perpendicular to the plane of the drawing, in which case the opening 7 has an elongated shape.

The part 1 of the shank which bulges out beyond the hole 7 could bulge outwards over the surface opposite the plane of division 5, with plane 5 instead parallel to the shank axis. The prismatic part 2 could then be inserted into the hole without having to displace and bend the other part of the shank and thereby being itself subjected to a bending moment.

But the bending of both parts of the shank is for various reasons advantageous. Firstly, it brings about a firm seat of the parts of the shank in the hole. Secondly, snap formations 10,11 thereby become effectively pressed together. Thirdly, the radially outer surfaces of the shank parts, which surfaces mate with the hole 7, are thereby placed under compression. This is important because these portions which get particularly heavily loaded by the transmission of force to the hole 7 and in certain cases also get subjected to notch effects, thereby get partially unloaded of the working stress which is thereby shifted rather more strongly to the unimpaired central cross-sections of the shank.

These general statements regarding the crosssection of the shank, the bending of the parts of the shank and the construction of the snap formations also hold for the embodiments explained below. Again, as regards the embodiments which follow one may also refer back to the description for FIG. 1, insofar as the same reference numbers are used as in FIG. 1 or insofar as the operation is obviously the same.

In the case of the second embodiment in accordance with FIGS. 2 and 3, one of the two head portions 12 is made as an eye for a cable strap 13 which may be of any nature. The parts 1 and 2 of the shank are bevelled off on the outside at their ends (as in the other embodiments also) in order to facilitate introduction into the panel-hole.

The embodiment in accordance with FIGS. 4 to 6 differs from that of FIGS. 2 and 3 in that the head portions 14 and 15 together form a head provided with an eye, through the opening 16 in which for example, a cable strap 13 may be pulled. The head portions 14 and 15 exhibit snap-engaging prominences and depressions which prevent or impede longitudinal and transverse relative shifting, so that both shank parts participate in the same way in the transmission of force. They are produced together with a flexible connecting bridge of material 17, so that at mounting it is not necessary to search for matching pairs every time. They consist advantageously of a flexible robust plastics such as nylon. This goes for all embodiments, in which each shank part is formed as a one-piece plastics moulding with its head portion.

The mounting-tool in accordance with FIGS. 7 and 8 consists of a sleeve 18 which is tubular in cross-section and which is closed at one end by a handplate 19, whilst the other end is open for receiving the pair of parts 14,15. In the sleeve is a crosswall 20, the distance of which from the open end 21 of the sleeve is equal to about the length of head portions 14,15. A pin 22 passes slidably through a central hole drilled in the crosswall, which is forced by a spring 23 towards the open end but which can be forced back so far that it disappears into the crosswall 20. One of the two head parts 15 exhibits, in the region of its end, a recess 24 which lies at the same point as the pin 22, in the device in accordance with FIG. 7. If the pair of parts 14,15 is put in the mounting tool, the head portion 14 is held by the pin 22 in the position shown in FIG. 7, whilst the head portion 15 can move back beside the pin 22 beyond the head portion 14. Mounting proceeds by the pair of parts being first of all inserted in the mounting tool, the part 1 of the shank is introduced into the hole 7 and then the tool by pressure on the handplate 19 is pushed forwards further in the same direction, whereupon the part 2 of the shank penetrates into the hole 7 too, because the associated head portion 15 is pushed by the crosswall 20 and the pin 22 can retreat against the force of the spring 23 until the final position illustrated in FIG. 8 is reached.

The fourth embodiment in accordance with FIG. 9 is, as regards the form of the shank and the snap formation, the same as the first embodiment. But the head portions are provided with hooks 25 turned towards one another, which together form a clamp, for example, for receiving a tube to hold the tube against the panel.

In the case of the fifth embodiment in accordance with FIG. 10, the opposite ends of a flexible clamp strap 26 are united to the head portions. As described in the case of the preceding embodiments the bulging part 1 of the shank is first of all inserted in the hole in the panel-like structure 8. Then the object to be held (cable harness, tube or the like) is laid in the clamp 26 and the other part 2 of the shank is inserted into the hole. This can be facilitated if at the transition from the clamp strap 26 to the part 2 of the shank a step 27 is provided on the outside, onto which force can be exerted by means of a screwdriver or the like.

At this point let it be in general remarked that as distinct from the embodiments illustrated, the snap formations 10,11 may be arranged on the parts 1,2 of the shank instead of on the associated head portions. The effect remains the same, especially since the snap formations in both cases get pressed together by the force generated by the bending of the parts of the shank. Preferably they are arranged at a certain distance from the region of the hole so that this force can act resiliently.

Whilst the length of the clamp in the FIG. 10 embodiment is unalterable, in the sixth embodiment in accordance with FIGS. 11 to 13 a length of clamped strap is provided which can be altered by a tightening device. The parts 1 and 2 of the shank are arranged on separate strap parts 28,29 of the clamp, which are provided with known means for inter-connection, for example snap teeth 31 and a pawl or snap formation in a clamphead 30. These parts may be coupled in pairs by a bridge 17 of material. But instead of that it is also possible to keep ready in each case one part consisting of shank part 1, strap part 28 and clamphead 30 a plurality of complementary parts with different lengths of strap in accordance with FIG. 13, which consists respectively of the shank part 2 and a strap part 29 with teeth 31, of different lengths. By means of the parts 1,2 of the shank these fasteners are first of all fastened to a panel-like structure in the way explained above. At any later time the object to be held may be fastened by connection of the strap 29 to the head 30.

Whilst in the case of the sixth embodiment in accordance with FIG. 12 the prismatic part 2 of the shank is provided as a distinct portion of the strap 29, in accordance with a seventh embodiment (not shown) the toothed clamp strap itself forms this prismatic part of the shank. This strap then carries at one end the part 1 of the shank, which bulges out beyond the hole and which carries snap teeth which fit the locking teeth of the clamp strap. For fastening of the shank part in the hole 7 and at the same time for fastening the object to be held, the free end of the clamp strap is inserted through the hole beside the shank part 1 and pushed into it until the required tension results. At the same time the part 1 of the shank gets locked by the toothed clamp strap in the usual way into the hole. A backwards movement of the clamp strap is prevented by the cooperating teeth on the shank part 1 and the clamp strap.

FIG. 14 illustrates an application in which the fastener in accordance with FIG. 1 is employed as a security fastening after the style of a lead seal. The fastener cannot be removed with destruction of the snap formations, in which case this destruction because of the arrangement of the snap action in the head is recognizable at the top face of the head. Just as with a lead seal it remains recognizable whether the connection has been loosened or not. One example of application is the fastening of heat consumption meters to heater bodies.

When in connection with the invention a panel-like structure is spoken of, what is meant thereby is any structure which is in the position to form a fastening hole of restricted length for receiving the two parts 1 and 2 of the shank. Thus it does not need to represent in the narrower sense of the word a panel in its entirety.

I claim:

1. A fastener of resilient material for a panel-like structure having an opening for receiving the fastener, the fastener having a head for engaging the face of the panel-like structure and an elongated shank extending longitudinally outwardly from the head for extension through the panel-like structure opening, the fastener having first and second fastener parts with respective head portions for forming said fastener head and respective elongated shank portions, with shank sections extending longitudinally from adjacent the head portions respectively with opposed longitudinally extending substantially flat faces respectively, the shank portions forming said elongated shank and successively insertable through a panel-like structure opening to assemble the fastener parts with the shank sections extending through and beyond the opening in opposed face to face engagement for anchoring the fastener within the panel-like structure opening, the shank section of the first shank portion having a face laterally tapering toward the opposed face of the other shank section and extending longitudinally from adjacent the respective head portion and through and beyond the panel-like structure opening and a longitudinally outwardly increasing cross-sectional area provided thereby and the shank section of the second shank portion having a face extending longitudinally from adjacent the respective head portion and through and beyond the panel-like structure opening and a generally uniform prismatic cross-sectional area, the shank sections being adapted to project longitudinally through the panel-like structure opening upon said insertion of the shank portions therethrough and said opposed longitudinally extending faces of the shank sections being relatively longitudinally inclined toward each other in the unstessed condition thereof and so that both shank sections are resiliently wedged laterally from their unstressed condition, after the shank portion of the first fastener part is fully inserted through and beyond the panel-like structure opening and as the shank portion of the second fastener part is thereafter fully inserted through and beyond the opening and to place the shank sections at the opening in tension at their opposed faces and in compression at their opposite outer edges.

2. A fastener according to claim 1, wherein the angle of said relative inclination of the opposed faces of the shank sections in the unstressed condition thereof does not exceed 15°.

3. A fastener according to claim 1 wherein the shank section of the first shank portion is generally wedge-shaped.

4. A fastener according to claim 1 wherein the fastener parts have cooperating snap engagement means for retaining the second shank portion against longitudinal withdrawal from the opening.

5. A fastener according to claim 1 wherein the head portions have respective means for connecting the fastener head to a clamp strap.

6. A fastener of resilient material for fastening a clamp strap to a panel-like structure having an opening for receiving the fastener, the fastener having a head for engaging the face of the panel-like structure and an elongated shank extending longitudinally outwardly from the head and through the panel-like structure opening and composed of first and second fastener parts with respective head portions for forming said fastener head and respective elongated shank portions, with shank sections extending longitudinally from adjacent the head portions respectively with opposed longitudinally extending substantially flat faces respectively, the shank portions forming said elongated shank and successively insertable through the panel-like structure opening to assemble the fastener parts with the shank sections extending through and beyond the opening in opposed face to face engagement for anchoring the fastener within the panel-like structure opening, the shank section of the first shank portion having a face laterally tapering toward the opposed face of the other shank section and extending longitudinally from adjacent the respective head portion and through and beyond the panel-like structure opening and a longitudinally outwardly increasing cross-sectional area provided thereby and the shank section of the second shank portion having a face extending longitudinally from adjacent the respective head portion and through and beyond the panel-like structure opening and a generally uniform prismatic cross-sectional area, said opposed longitudinally extending faces of the shank sections being relatively longitudinally inclined toward each other in the unstressed condition thereof and so that both shank sections are wedged laterally from the unstressed condition, after the shank portion of the first fastener part is fully inserted through and beyond the panel-like structure opening and as the shank portion of the second fastener part is thereafter fully inserted through and beyond the opening, the head portions having respective coacting means for connecting each fastener head portion to a tensionable clamp strap and for thereby limiting the longitudinal withdrawal of the second shank portion relative to the first shank portion.

7. A fastener according to claim 6 wherein the coacting means comprises channel portions in the head portions forming a common channel for a clamp strap.

8. A fastener according to claim 7 wherein the coacting means additionally comprises cooperating snap engagement means on the head portions.

9. A clamp strap fastener of resilient material for fastening a clamp strap to a panel-like structure having an opening for receiving the fastener, the fastener having a head for engaging the face of the panel-like structure and an elongated shank extending longitudinally outwardly from the head and through the panel-like structure opening and composed of first and second fastener parts with respective head portions for forming said fastener head and respective elongated shank portions, with shank sections extending longitudinally from adjacent the head portions respectively with opposed longitudinally extending substantially flat faces respectively, the shank portions forming said elongated shank and successively insertable through a panel-like structure opening to assemble the fastener parts with the shank sections extending through and beyond the opening in opposed face to face engagement for anchoring the fastener within the panel-like structure opening, the shank section of the first shank portion having a face laterally tapering toward the opposed face of the other shank section and extending longitudinally from adjacent the respective head portion and through and beyond the panel-like structure opening and a longitudinally outwardly increasing cross-sectional area provided thereby and the shank section of the second shank portion having a face extending longitudinally from adjacent the respective head portion and through and beyond the panel-like structure opening and a generally uniform prismatic cross-sectional area, said opposed longitudinally extending faces of the shank sections being relatively longitudinally inclined toward each other in the unstressed condition thereof and so that both shank sections are wedged laterally from the unstressed condition, after the shank portion of the first fastener part is fully inserted through and beyond the panel-like structure opening and as the shank portion of the second fastener part is thereafter inserted through and beyond the opening, the clamp strap fastener further having tensionable clamp strap means with a strap portion connected to each head portion whereby longitudinally withdrawal of the second fastener part relative to the first fastener part is prevented by the clamp strap means in its tensioned state.

* * * * *